455-601
7/19/83

AU 233 EX
XR 4,394,780

United States Patent [19]
Mooradian

[11] 4,394,780
[45] Jul. 19, 1983

[54] BALLOON COLLECTOR/DIRECTOR SUNSUBSATCOM CONCEPT

[75] Inventor: Gregory C. Mooradian, Del Mar, Calif.

[73] Assignee: The United States of America as represented by the Secretary of the Navy, Washington, D.C.

[21] Appl. No.: 239,254

[22] Filed: Mar. 2, 1981

[51] Int. Cl.³ .............................................. H04B 9/00
[52] U.S. Cl. ................................. 455/618; 343/880; 455/600; 455/601; 455/614
[58] Field of Search ............... 455/600, 601, 605, 606, 455/607, 614, 618; 343/706, 880, 915

[56] References Cited
U.S. PATENT DOCUMENTS

| | | | |
|---|---|---|---|
| 235,199 | 12/1880 | Bell | 455/614 |
| 2,814,038 | 11/1957 | Miller | 343/757 |
| 3,056,131 | 9/1962 | McCreary | 343/781 |
| 3,808,428 | 4/1974 | Barry et al. | 455/609 |

OTHER PUBLICATIONS

LaFond–Paraballoon Antennas–New Space Tool – Missiles and Rockets, Jan. 11, 1960, pp. 21, 22 and 25.

*Primary Examiner*—Joseph A. Orsino, Jr.
*Attorney, Agent, or Firm*—Robert F. Beers; Ervin F. Johnston; Thomas Glenn Keough

[57] ABSTRACT

An apparatus and method for broadcasting and optically transmitting data from an orbiting satellite employs an inflatable balloon-like envelope for receiving and collecting sunlight, a remotely driven modulator for impressing information by modulating received sunlight and another inflatable balloon-like envelope for redirecting the modulated sunlight to a designated area on earth. Sequential addressing of spot areas results in large area broadcast. In addition to using freely available sunlight, the complexity and bulk of the sunlight and redirecting surfaces are greatly reduced to enable the launched deployment of a larger, and hence, more effective communication system.

12 Claims, 4 Drawing Figures

BALLOON COLLECTOR/DIRECTOR SUNSUBSATCOM CONCEPT

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This invention relates to an application copending by Gergory C. Mooradian and entitled SUNSUBSAT-COM, NC 65,120, U.S. Patent and Trademark Office Ser. No. 234,059.

BACKGROUND OF THE INVENTION

Over the years a variety of communication systems have evolved which, to one degree or another, make reliable world-wide communications. VLF and ULF radio communication systems have long proven their worth yet they have some limitations. Their susceptibility to jamming and their inability to penetrate seawater effectively have limited their usefulness for high priority communications.

The technological advances of space exploration have made available orbiting space platforms and recent advances in laser technology have provided a number of new communication devices. A marriage between these technologies logically is foreseen to provide a more reliable high priority communication system.

Modulatable blue/green energy penetrates cloud covers and a considerable depth in seawater. The high directability of blue/green lasers and their location on orbiting platforms reduces the possibility of outside electromagnetic interference so that it would appear an orbiting laser system would satisfy the need for reliable widespread communications.

Unfortunately, the technological expectations have not come to be. The current family of lasers and their related equipments lack the efficient, long-life, high-peak power, and high-average power requirements for space-qualified laser sources. High-transmission, wide-angle, narrow-band optical filtering arrangements suitable for the subsurface platform also are lacking. Although the existing lasers and filters have some degree of flexibility, they are not refined to the point for optimizing transmission through different types of water. In addition, the state-of-the-art fails to provide for sufficient spacecraft offboard sight pointing of the narrow laser beam which would be directed at a specific submerged receiver. Similarly, most of the characteristics of a laser that enhance performance in conventional optical communications systems are so degraded by the satellite-to-subsurface propagation channel, that utilization of the advantages are difficult (the transmission channel through the clouds and seawater to degrades the nature of the transmitted laser pulse spatially, angularly and temporaly that photon detection in the presence of background noise is difficult even with projected components. The nature of the cloud-ocean channel is foreseen to require additional receiver and transmitter complexity that might even further degrade performance. The channel adversely influences the system's performance by, first, degrading the received pulse and by, second, degrading component capabilities required to detect the pulse).

Typically, the characteristics of a laser which normally serve to greatly enhance communication performance might be a disadvantage in communicating with widely scattered submerged receivers. The narrow spectral emission of the laser, the narrow pulse widths and high peak powers for discriminating against solar background, the narrow beam widths (small spot size) to concentrate energy density, and the narrow angular source size (light appearing to come from only one direction) could be considered as disadvantageous to a worldwide communication system that seeks to avoid betraying the submerged receivers' locations. Furthermore, the monochromatic nature of laser light allows high water transmission and a narrow optical prefiltering of solar background only if a narrow-band, wide-angle filter can be constructed and, only if it can be obtained at the correct wavelength matching both the laser wavelength and the optimum water transmission wavelengths.

Collimated laser beams are useful only if a means exists to off-boresight point the beams and if the area coverage requirements permit their use and if the clouds do not further spread the beam. Enhancement due to "blue sky" Rayleigh scattering contributions at large zenith angles are also lost with small spot sizes. In like manner the narrow pulses possible with lasers permit gating out of most daytime background radiation but only if clouds do not stretch the pulse to values approaching 100 microseconds. The angular spreading due to both clouds and the ocean make the optical energy appear to come from virtually all forward directions which again severely limits narrowband detection. From the foregoing it is apparent that the orbiting of a modulatable laser light source poses formidable obstacles to actual deployment.

Finally, if a solar panel power supply is relied upon, it would be huge and cumbersome. Rigid reflecting panels, arranged in a paraboloid or some such other structure for receiving and concentrating sunlight and for further redirecting it would be too large and weighty for most space launches. The load and size of rigid prefabricated solar panels or reflectors are formidable and greatly compromise the cost effectiveness of deploying a rigid communication satellite.

Thus, there is a continuing need in the state-of-the-art for an orbiting communication satellite that is compact at launch to reduce the problems associated with launch of a space payload and yet which makes use of readily available sunlight to assure reliable communications.

SUMMARY OF THE INVENTION

The present invention is directed to providing an improvement for communication systems that optically transmits data from an orbiting satellite. A first means is carried on the orbiting platform for inflatably distending a sunlight reflecting and concentrating surface. Means are disposed to receive the concentrated sunlight for modulating it in accordance with earth-originating electromagnetic modulating signals. A second inflatable means is carried on the orbiting platform and is provided to define a modulated sunlight direction surface which projects the modulated sunlight to a designated area on earth.

The method for optically transmitting data from an orbiting satellite includes the inflatable distending of a sunlight reflecting and concentrating surface, the modulating of the reflected and concentrated sunlight and the inflatable distending of a modulated sunlight directing surface to assure that modulated sunlight serves as a vehicle for carrying data to a designated area on earth. Providing power from sunlight from an on-board means assures long-term, reliable actuation of the orbiting platform.

A prime object of the invention is to provide an improvement for orbiting satellite communications.

Another object of the invention is to provide an improvement for an orbiting platform which is readily deployable to gather sunlight for data transmission.

Still another object is to provide an inflatable sunlight collecting and directing means which improves the optical communication capability of an orbiting satellite.

Yet another object is to provide a pair of inflatable spheres having appropriately treated surfaces for reflecting, concentrating and directing modulated sunlight. Inflation of the balloons in the vacuum of space would guarantee the exact spherical curvature.

Still another object is to provide an improvment for an orbiting satellite that has inflatable surfaces for reflecting and directing sunlight which is modulated by the information of remotely originating electromagnetic signals.

Yet another object is to provide an orbiting satellite communication system employing a readily inflatable, collecting and redirecting surface that is capable of operation during a period designated as day or night on an area of earth.

These and other objects, advantages and novel features of the invention will become apparent from the following detailed description of the invention when considered in conjunction with the accompanying drawings.

DESCRIPTION OF THE PREFERRED EMBODIMENT

Figure 1:
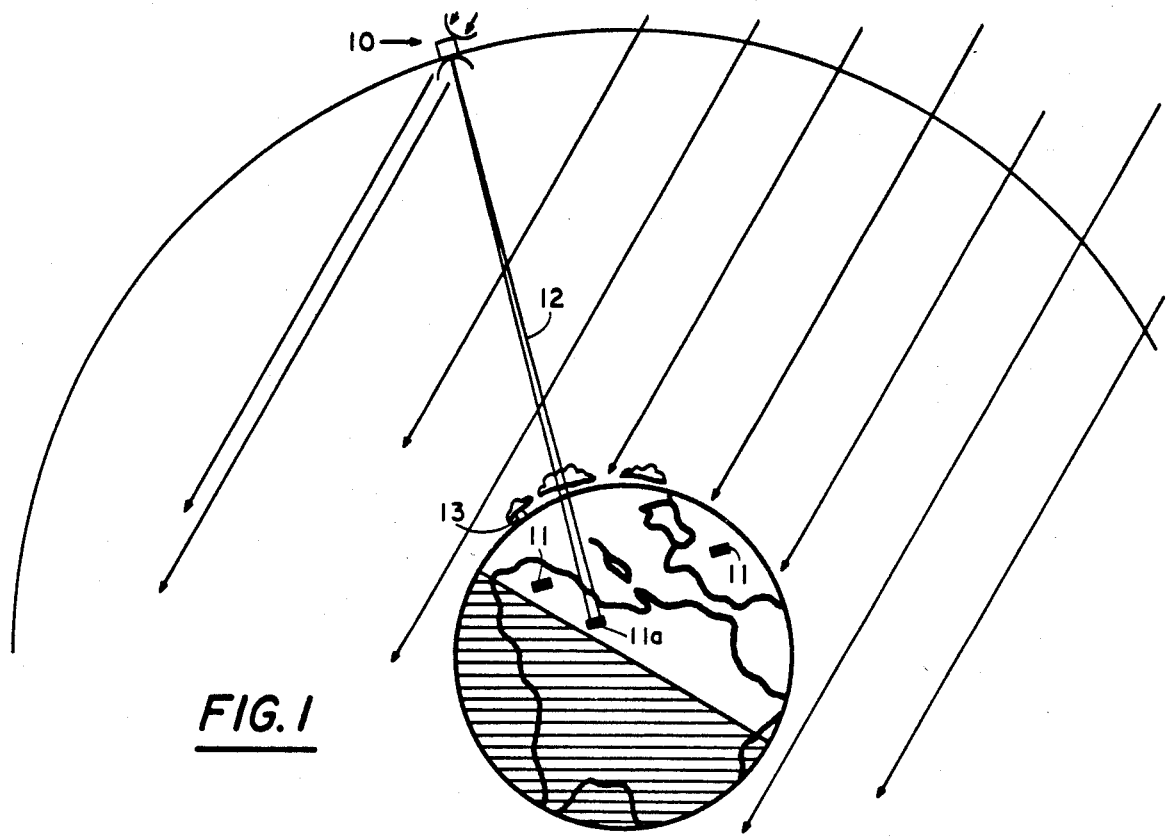
FIG. 1 is an isometric depiction of the method and the apparatus involved of the invention operatively disposed for daytime operation.
Figure 2:
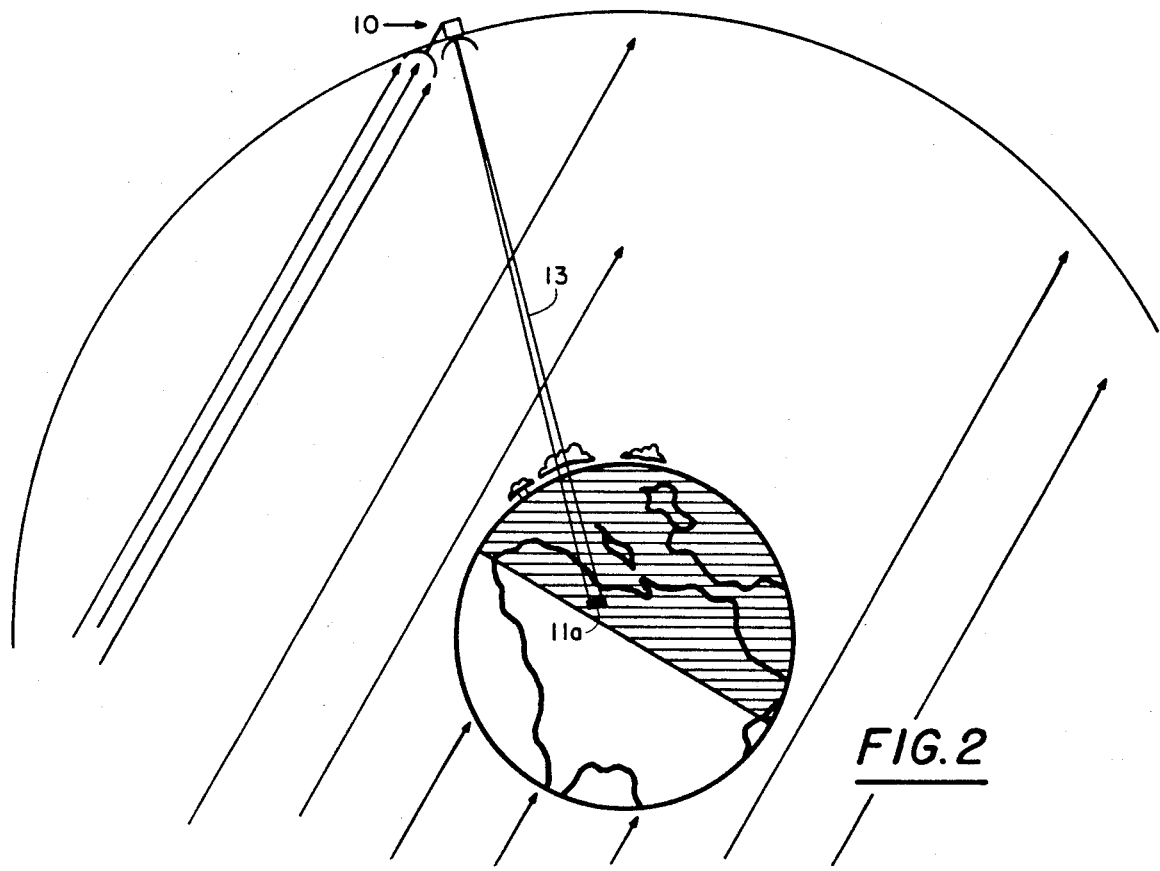
FIG. 2 is a schematic depiction of the invention operatively disposed to assure reliable nighttime operation.

Referring now to FIGS. 1 and 2 of the drawings, an orbiting platform 10, fabricated in accordance with the teachings of this invention, is in orbit during daytime and nighttime relative to a designated area on earth. It is to be noted that the particular orbiting platform can maintain selective communications within the designated area at any time. By appropriately locating a number of orbiting platforms worldwide coverage could be assured, it being only necessary to orient various elements elaborated on below. The orbits of the platforms could be synchronous with the earth's rotation or could be selectively orbiting to provide a desired communication capability. In any event, the multiplicity of orbiting platforms are located at appropriate spacings to assure communications with a number of receiving stations 11. Because the invention relies on modulated sunlight, the blue-green wavelengths will penetrate cloud cover and certain depths in seawater to reliably reach surface and submerged receivers including submarines.

Each of the orbiting satellites has a cone 12 of transmission covering its designated area. This cone of transmission defines an area within which a particular receiver 11a can pick up the relayed information. The size of this area is variable and is adjustable to accommodate the offsetting requirements of signal strength vs signal information dispersion.

Since it is desirable to transmit optical information through cloud cover and into a considerable depth of seawater, the cone might have a diameter of approximately 200 miles. The size of the area does not disclose the exact location of a receiving station; hence, the station can be located anywhere within the spot area to receive the transmitted data. A laser scanner covering such an area would be slow and power-consuming. If a laser is used and specifically designates a particular area, this might be monitorable by others to specifically locate the receiving station particularly, a submerged receiving station. This undesirable consequence is not aided by the apparatus and method of this inventive concept.

Figure 3:
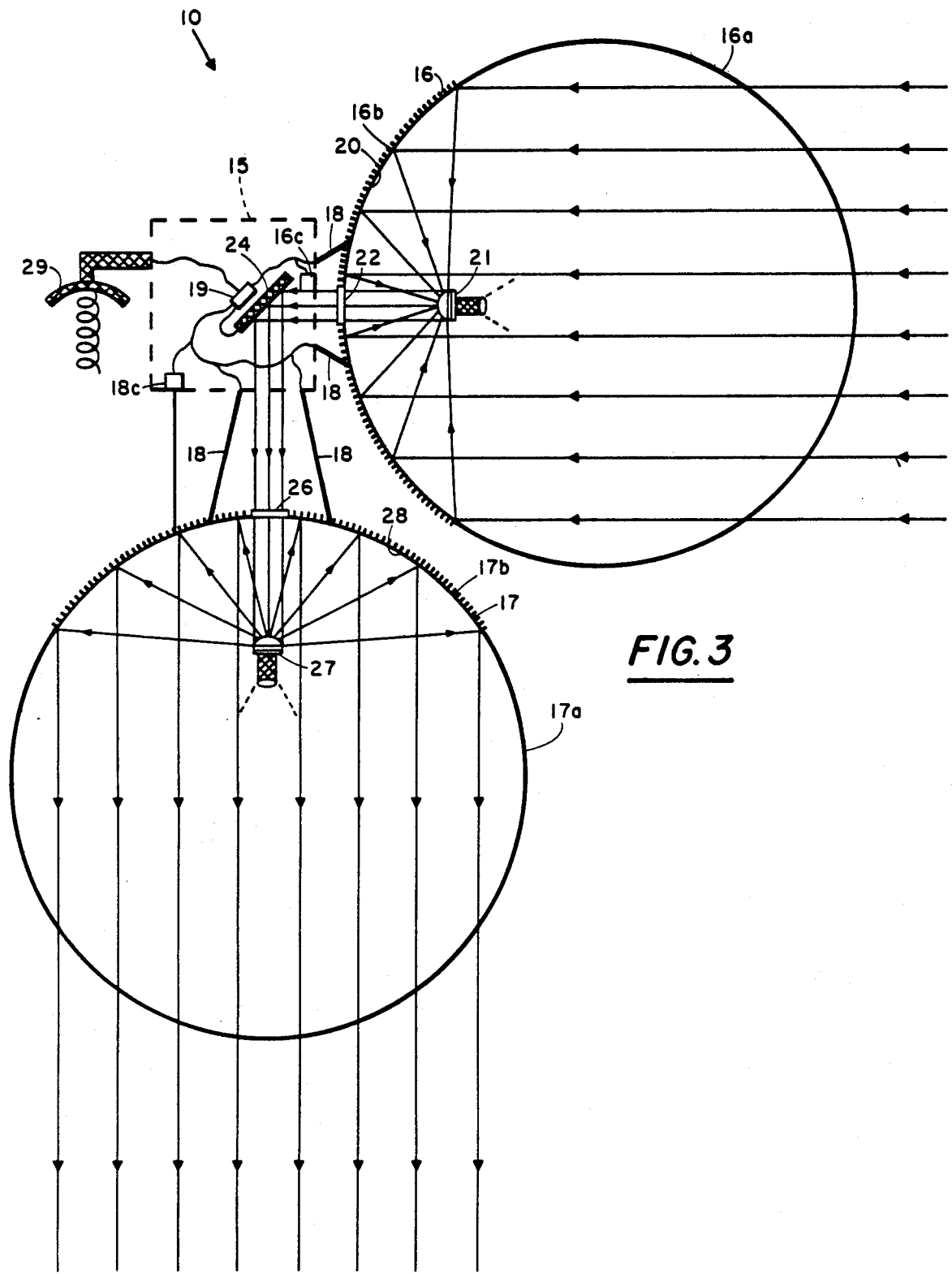
FIG. 3 depicts a representation of the apparatus of the invention for modulating received sunlight.

Looking to FIG. 3, the orbiting platform includes a platform member 15 supporting an inflatable collector balloon 16 and a director balloon 17. Adjustable mounting means, schematically shown by bracket members 18, are extended and articulated by a control system 19 to orient the collector balloon toward the sun and the director balloon toward its designated area on the face of the earth. The control system 19 also is operatively coupled to an array of impulse rockets, gyros and other stabilizing devices that are well known to space engineers and technicians that to enable the proper orientation of the collector and director balloons.

The collector and director balloons are each fabricated from a thin sheet of a transparent plastic-like material each having a nearly hemispherical transparent part 16a and 17a and a reflective part 16b and 17b that is coated or deposited with a sunlight reflective silvery layer. This layer could even be selectively reflective in the blue-green spectrum. The material is capable of being folded into a lightweight, compact package for ease of handling during launch and deployment. The material commercially marketed under the trade designation "Mylar" could be used although several flexible suitably treated, tough, thin film materials could be substituted. After a satellite is properly orbited, sources of pressurized gas 16a and 18a are appropriately coupled and actuated by control logic 19 to distend or inflate the balloons. In space only a very small amount of gas is required. The transparent portion 16a permits passage of incoming sunlight. Reflector layer 16b, being deposited or otherwise coated on the inner surface of the collector balloon, reflects and concentrates the sunlight toward a lens-reflector or mirror unit 21.

The lens-reflector (mirror) unit collimates the reflected, concentrated light and aims it through a transparent window 22 provided in the collector balloon wall and onto a flat reflecting mirror 24. The flat reflecting mirror can double as a sunlight modulator, the details of which will be discussed below.

The modulated light is fed through a transparent window 25 provided in director balloon 17 and to another lens-reflector (mirror) unit 27. In this instance the lens-reflector unit receives collimated light from the modulator and disperses it on a reflective layer 17b. The reflective layer directs the modulated sunlight through transparent wall 17a and toward its designated area on earth.

The collector and director balloons are shown as being the same size. However, their relative sizes can differ and the relative sizes of the reflective layers can vary to change the signals as the situations demand.

Modulation of the concentrated sunlight by the flat mirror can proceed in a number of ways. The flat mirror could include a matrix array of light transmissive varying elements such as rows and columns of liquid crystal elements laminated over the reflecting surface, an electro-optical modulator or a mechanical shutter device working like a heliograph for imparting interruptions or variations of the transmitted intensity of the concentrated sunlight, or an electro-mechanical device for changing the curvature of 21 or 27.

These interruptions and variations may be in accordance with an on-board program in control system 19 or provided from an earthborne transmitter 13 via a microwave antenna-data link 29. In either case, the received sunlight is appropriately modulated by the preprogrammed or externally originating electromagnetic signals so that the modulated directed beam from director balloon 17 carries the information to the surface or sub-surface receiving station 11a.

Lens-reflectors 21 and 27 optionally are located near or farther from reflective layer 17b than shown to vary the size of the modulated light beam. Lens-reflector 21 might also be modified to include a multitude of solar cells that work as on-board power supply. Any servo motors, amplifiers, direction sensing and alignment devices can be actuated by power from this supply. This feature reduced the load imposed by batteries on other power supplies.

Figure 4:
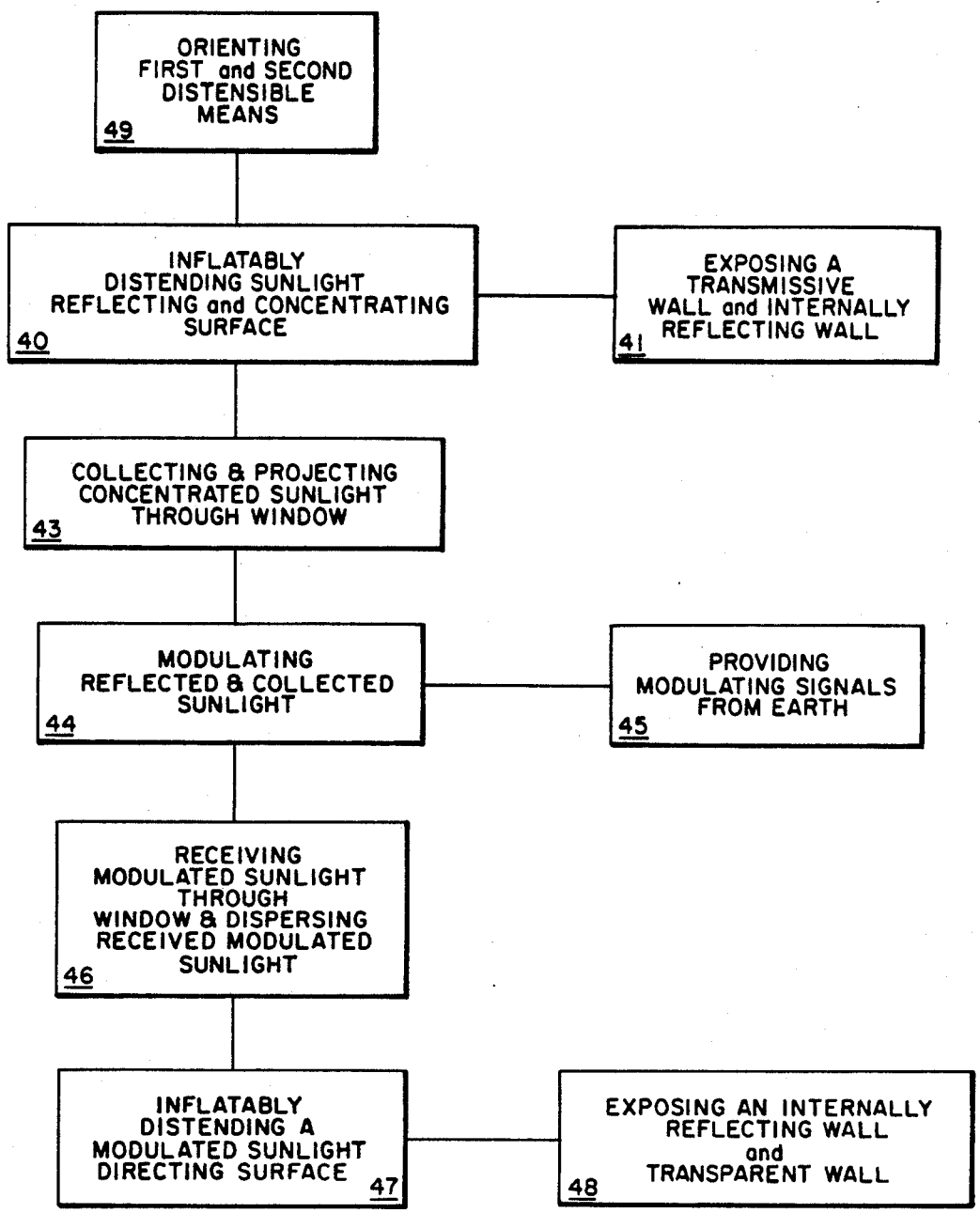
FIG. 4 is a block diagram representation of the method of assuring modulation of received sunlight.

What has been shown is the apparatus which assures the utilization of readily available sunlight for the transmission of information to surface and sub-surface receivers within a designated area. The novel method for achieving such an operation is set forth in FIG. 4. First, there is the inflatably distending 40 of the sunlight reflecting and concentrating surface of the collector balloon by effecting the exposing 41 of the transmissive wall and internally reflecting wall.

Collecting and projecting 43 the sunlight through a window allows the modulating 44 of the sunlight by a liquid crystal, shutter arrangement and the like, by interrupting or modifying the intensity of the sunlight. The modulation of the sunlight can originate an on-board preprogrammed schedule or from providing 45 electromagnetic modulating signals coming from an earthborne transmitter.

Receiving and dispersing 46 modulated sunlight through a window enables the inflatable, distending 47 of a modulated sunlight directing surface. The exposing 48 of the internally reflecting wall and transparent wall allows the selective direction of modulating sunlight to a designated area on earth so that a surface or subsurface receiver is placed in communication with the earthborne transmitter. Proper operation of the apparatus and method calls for the orienting 49 of the first and second distensible means to assure that sunlight is received, concentrated, collected, modulated and redirected to a designated area as desired.

Obviously many modifications and variations of the present invention are possible in the light of the above teachings. It is therefore to be understood that within the scope of the appended claims the invention may be practiced otherwise than as specifically described.

What is claimed is:

1. In a communication system for optically transmitting data from an orbiting satellite, an improvement therefor is provided comprising:
   a first inflatable envelope carried on the orbiting platform for inflatably distending to define a sunlight reflecting and concentrating surface, the inflatable envelope has a portion of its inflatable envelope wall transparent to allow the penetration of the sunlight and another portion of its inflatable envelope provided with an internally reflective layer to reflect and concentrate the sunlight;
   means mounted on the orbiting platform for modulating the reflected and collected sunlight; and
   a second inflatable envelope carried on the orbiting platform and oriented to receive the modulated sunlight for inflatably distending to define a modulated sunlight direction surface, the inflatable envelope has a portion of the inflatable envelope wall provided with an internally reflective layer to reflect and direct the modulated sunlight away from the orbiting platform and another portion of the inflatable envelope transparent to allow the penetration of the modulated sunlight and the direction thereof away from the orbiting platform.

2. An improved communication system according to claim 1 further including:
   means mounted on the orbiting platform for providing modulating signals.

3. An improved communication system as to claim 2 in which the modulating signal providing means is an on-board preprogrammed source of signals.

4. An improved communication system according to claim 2 in which the information modulating signal providing means is an antenna carried on the orbiting platform oriented to receive modulating signals from a remote station.

5. An improved communication system according to claim 4 further including:
   means carried in the first inflatable envelope for collecting and projecting the reflected and concentrated sunlight through a transparent window provided in the reflective layer in the inflatable envelope; and
   means carried in the second inflatable envelope for receiving the modulated sunlight through a transparent window provided in the reflective layer in the inflatable envelope and for dispersing the modulated sunlight to the internally reflective layer.

6. An improved communication system according to claim 5 in which the first inflatable envelope and the second inflatable envelope are spherically-shaped.

7. An improved communication system according to claim 6 further including:
   means for orienting the first and second inflatable envelopes toward the sun and toward a designated area on earth, respectively.

8. A method for optically transmitting data from an orbiting satellite comprising:
   inflatably distending a sunlight reflecting and collecting surface in a first distensible means to reflect and collect sunlight;
   modulating the reflected and collected sunlight with the data; and
   inflatably distending a modulated sunlight directing surface in a second distensible means in order to transmit the data modulated sunlight.

9. A method according to claim 8 in which the step of inflatably distending the sunlight reflecting and collective surface includes the exposing of a light transmissive wall of an inflatable envelope of the first distensible means and an internally reflecting wall of inflatable envelope of the first distensible means and the step of inflatably distending the directing surface includes the exposing of an internally reflecting wall in the second distensible means to reflect the modulated sunlight and further includes the exposing of a transparent wall in the second distensible means to allow the penetration of the reflected modulated sunlight through the transparent wall and direct it away from the orbiting platform.

10. A method according to claim 9 further including:
providing modulating signals from an earth originating source.

11. A method according to claim 10 further including:
collecting and projecting the reflected and concentrated sunlight through a transparent window provided in the internally reflecting wall of the first distensible means;
receiving the modulated sunlight through a transparent window provided in the internally reflecting wall of the second distensible means;
dispersing the received modulated sunlight to the internally reflecting wall in the second distensible means.

12. A method according to claim 11 further including:
orientating the first and second distensible means toward the sun and a designated area on earth, respectively.

* * * * *